United States Patent
Da et al.

(10) Patent No.: US 12,500,230 B2
(45) Date of Patent: Dec. 16, 2025

(54) METHOD FOR PREPARING SURFACE-MODIFIED LITHIUM/SODIUM MULTICOMPONENT CATHODE MATERIALS

(71) Applicants: Zhejiang Amandarry New Materials Technologies Co., Ltd., Jiaxin (CN); SODIUM POWER LLC, Okemos, MI (US)

(72) Inventors: Senyin Da, Jiaxing (CN); Zhangping Yang, Jiaxing (CN); Jie Chen, Okemos, MI (US); Amanda W Han, Okemos, MI (US)

(73) Assignees: Zhejiang Amandarry New Materials Technologies Co., Ltd., Jiaxin (CN); SODIUM POWER LLC, Okemos, MI (US)

( * ) Notice: Subject to any disclaimer, the term of this patent is extended or adjusted under 35 U.S.C. 154(b) by 0 days.

(21) Appl. No.: 19/235,678

(22) Filed: Jun. 12, 2025

(65) Prior Publication Data
US 2025/0357471 A1 Nov. 20, 2025

Related U.S. Application Data

(63) Continuation-in-part of application No. PCT/CN2024/106352, filed on Jul. 19, 2024.

(30) Foreign Application Priority Data
May 17, 2024 (CN) .......................... 202410613035.6

(51) Int. Cl.
H01M 4/04 (2006.01)
H01M 4/36 (2006.01)
(Continued)

(52) U.S. Cl.
CPC ........... *H01M 4/366* (2013.01); *H01M 4/525* (2013.01); *H01M 4/628* (2013.01)

(58) Field of Classification Search
None
See application file for complete search history.

(56) References Cited

FOREIGN PATENT DOCUMENTS

| CN | 109768254 A | 5/2019 |
| CN | 111435737 A | 7/2020 |

(Continued)

*Primary Examiner* — Austin Murata
(74) *Attorney, Agent, or Firm* — Addison D. Ault; IPGentleman Intellectual Property Services, LLC

(57) ABSTRACT

A method for preparing a surface-modified lithium/sodium multi-element cathode material, including lithium-ion battery layered oxides ($LiTMO_2$, TM=Ni/Co/Mn) and sodium-ion layered oxides ($Na_xTMO_2$, TM=transition/alkali/alkaline earth metals such as Ti/V/Cr/Mn/Fe/Co/Ni/Cu/Zn/Sn/Ir/Ru/Li/Mg). Taking a high-nickel ternary material (with surface-attached lithium carbonate) as an example: the material is mixed with aluminum diethylphosphinate and sintered in a sintering atmosphere at 500-900° C. for 2-20 h (heating rate: 0.5-5° C./min) to form a coating layer of aluminum phosphate/lithium phosphate. This coating stabilizes the interface, alleviates cyclic crystal structure degradation, and extends cycle life. For sodium-ion layered oxides ($Na_xTMO_2$), a similar modification forms $Na_{(3-3x)}Al_xPO_4$ as the surface layer, thereby enhancing electrochemical performance.

7 Claims, 4 Drawing Sheets

(51) Int. Cl.
*H01M 4/525* (2010.01)
*H01M 4/62* (2006.01)

(56) References Cited

FOREIGN PATENT DOCUMENTS

| | | |
|---|---|---|
| CN | 114975914 A | 8/2022 |
| CN | 117393739 A | 1/2024 |
| JP | 2012089472 A | 5/2012 |
| WO | 2022267187 A1 | 12/2022 |
| WO | 2024082642 A1 | 4/2024 |

METHOD FOR PREPARING SURFACE-MODIFIED LITHIUM/SODIUM MULTICOMPONENT CATHODE MATERIALS

CROSS REFERENCE TO THE RELATED APPLICATIONS

This application is a continuation-in-part application of International Application No. PCT/CN2024/106352, filed on Jul. 19, 2024, which is based upon and claims priority to Chinese Patent Application No. 202410613035.6, filed on May 17, 2024, the entire contents of which are incorporated herein by reference.

TECHNICAL FIELD

The present invention pertains to the field of battery technology, specifically to a method for preparing surface-modified lithium/sodium multicomponent cathode materials.

BACKGROUND

Lithium-ion and sodium-ion batteries exhibit high specific energy and charge-discharge efficiency, making them highly promising for widespread applications. The capacity of cathode materials directly determines the specific energy of these batteries. Lithium-ion layered oxide cathode materials, characterized by their high specific capacity and cost-effectiveness, are the prevailing cathode materials of choice in commercial lithium-ion batteries. Sodium-ion layered oxide cathode materials (e.g., $Na_xTMO_2$), which share structural similarities with their lithium counterparts, are regarded as the most commercially viable cathode materials for sodium-ion batteries.

However, lithium/sodium multicomponent cathode materials suffer from performance decay caused by structural degradation during cycling, particularly under high-voltage operating conditions. This limitation hinders the further development of advanced cathode materials.

SUMMARY

Given this, the present invention provides a preparation method of a surface-modified lithium/sodium multicomponent cathode material to solve the above problems. Taking the high-nickel ternary material ($LiNi_xCo_yMn_{(1-x-y)}O_2$, $x \geq 0.8$), which is a representative material of the lithium multicomponent cathode material, as an example, it includes the following steps:

STEP 1: Provide a high-nickel ternary cathode material and aluminum diethylphosphinate, where a mass ratio of the high-nickel ternary cathode material to the modifier aluminum diethylphosphinate is 100: (0.01-5), and the high-nickel ternary cathode material has a surface containing residual alkaline lithium carbonate ($Li_2CO_3$).

STEP 2: Provide a sintering device filled with a sintering atmosphere.

STEP 3: Mix the high-nickel ternary cathode material and aluminum diethylphosphinate.

STEP 4: Put the mixed high-nickel ternary cathode material and aluminum diethylphosphinate into the sintering device for sintering. The sintering temperature is 500° C.-900° C., the sintering time is 2 h-20 h, and the heating rate is 0.5° C./min-5° C./min to prepare a high-nickel ternary cathode material with a coating layer. The coating layer is formed by aluminum phosphate and lithium phosphate.

Further, the high-nickel ternary cathode material is NCM811, and the specification of NCM811 is 2 μm<D50<16 μm.

Further, the sintering atmosphere is one of oxygen, air, nitrogen, argon, hydrogen, and a hydrogen-argon mixed gas.

Further, the method of mixing the high-nickel ternary cathode material and aluminum diethylphosphinate is one of mechanical mixing and ball-milling mixing.

Further, in step STEP104, the sintering temperature is 600° C.-700° C.

Further, in step STEP104, the sintering time is 10 h.

Further, in step STEP104, the heating rate is 2° C./min.

Compared with the prior art, by constructing a stable interfacial layer, namely the coating layer, on the surface of the high-nickel ternary material, and the coating layer is formed by aluminum phosphate and lithium phosphate, the problem of crystal structure degradation of the high-nickel ternary material during the cycling process can be effectively alleviated, and thus the cycle life can be effectively extended. This is mainly because when phosphate compounds are applied to the surface modification of the high-nickel ternary material, on the one hand, they can have a stable structure due to the strong covalent bond between P and O. On the other hand, phosphates have certain reactivity with residual lithium compounds at high temperatures and can generate lithium-conductive compounds, namely lithium phosphate. The stable interface formed by both effectively isolates the contact between the electrode material and the electrolyte inhibits the interfacial side reactions of the high-nickel ternary material during the electrochemical cycling process, reduces the impedance generated on the electrode surface by substances such as lithium alkyls produced by the decomposition of the electrolyte, and effectively improves the cycling performance.

Similarly, by constructing an interfacial layer, namely the modified layer, on the surface of the layered metal oxide cathode material for sodium-ion batteries, the modified layer is composed of the sodium aluminum phosphate compound $Na_{(3-3x)}Al_xPO_4$. The outermost $Na_{(3-3x)}Al_xPO_4$ acts as a physical barrier, which can effectively inhibit the side reactions at the interface, improve the kinetic performance of the interface, and enable the modified material to exhibit excellent rate performance.

DETAILED DESCRIPTION OF THE EMBODIMENTS

The following describes specific embodiments of the present invention in detail. It should be understood that these examples are provided for illustrative purposes and do not limit the scope of the invention.

Figure 1:
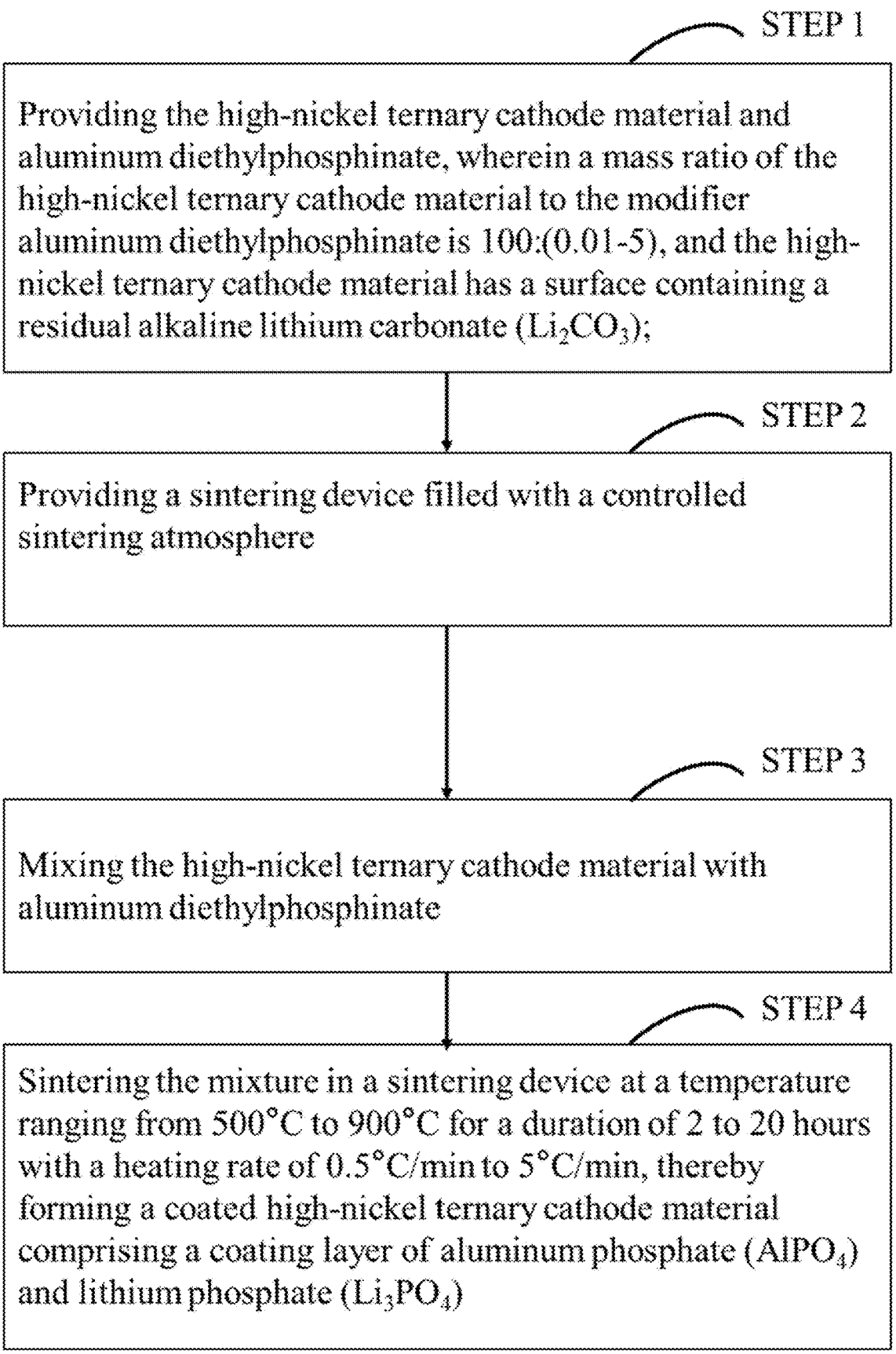
FIG. 1 is a flowchart illustrating a representative method for preparing a surface-modified high-nickel ternary cathode material according to the present invention.

As shown in FIG. 1, the method for preparing a surface-modified high-nickel ternary cathode material includes the following steps:

Step 1: Provide a high-nickel ternary cathode material and aluminum diethylphosphinate.

The mass ratio of the high-nickel ternary cathode material to aluminum diethylphosphinate is 100: (0.01-5).

The high-nickel ternary cathode material has a surface containing residual alkaline lithium carbonate ($Li_2CO_3$).

Step 2: Provide a sintering device filled with a controlled sintering atmosphere.

Step 3: Mix the high-nickel ternary cathode material with aluminum diethylphosphinate.

Step 4: The mixture is sintered in a sintering device at a temperature of 500° C. to 900° C. for 2 to 20 h with a heating rate of 0.5° C./min to 5° C./min to form a coated high-nickel ternary cathode material having a coating layer that primarily includes aluminum phosphate ($AlPO_4$) and lithium phosphate ($Li_3PO_4$).

The method utilizes a high-nickel ternary cathode material with the general formula $LiNi_xCo_yMn_{(1-x-y)}O_2$ ($x \geq 0.8$), specifically $LiNi_{0.8}Co_{0.1}Mn_{0.1}O_2$ (NCM811) where the transition metals Ni:Co:Mn maintain an 8:1:1 molar ratio, having a median particle size (D50) between 2-16 μm with preferred ranges of 3-5 μm or 9-12 μm. The cathode material is combined with aluminum diethylphosphinate at a mass ratio of 100: (0.01-5), where ratios below 0.01% provide insufficient cycling improvement and ratios above 5% induce capacity degradation. The mixture is homogenized by mechanical blending or ball milling and sintered in a box-type atmosphere furnace under oxygen, air, nitrogen, argon, hydrogen, or hydrogen-argon mixtures at 500-900° C. (preferably 600-700° C.) for 2-20 h (preferably 10 h) with a heating rate of 0.5-5° C./min (preferably 2° C./min), where temperatures below 500° C. prevent complete aluminum diethylphosphinate decomposition and temperatures above 900° C. cause structural damage, while heating rates below 0.5° C./min increase production costs and rates above 5° C./min promote undesirable volatilization.

During the sintering process, aluminum diethylphosphinate undergoes thermal decomposition primarily into diethylphosphinic acid and aluminum phosphate ($AlPO_4$). The reaction mechanism is summarized as follows:

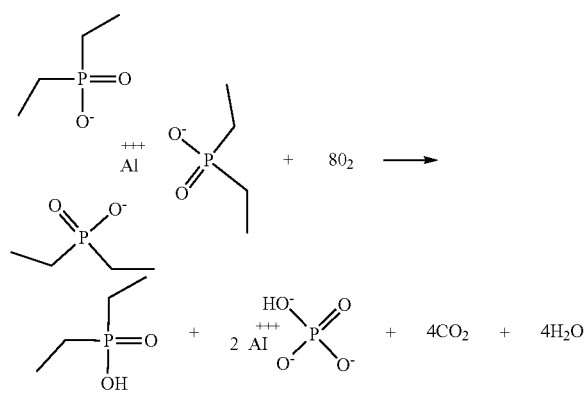

Residual lithium on the high-nickel ternary cathode material surface spontaneously reacts with ambient moisture to form lithium hydroxide (LiOH), which subsequently reacts with atmospheric carbon dioxide to generate lithium carbonate ($Li_2CO_3$), wherein during high-temperature processing, the lithium carbonate ($Li_2CO_3$) reacts with aluminum phosphate ($AlPO_4$) to form lithium phosphate ($Li_3PO_4$) while simultaneously enabling aluminum doping into the cathode lattice structure. The reaction pathways are:

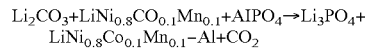

$$Li_2CO_3 + LiNi_{0.8}Co_{0.1}Mn_{0.1} + AlPO_4 \rightarrow Li_3PO_4 + LiNi_{0.8}Co_{0.1}Mn_{0.1}-Al + CO_2$$

The modified high-nickel ternary cathode material prepared through the above steps includes a coating layer formed of aluminum phosphate ($AlPO_4$) and lithium phosphate ($Li_3PO_4$).

A similar surface modification method applies to sodium-ion layered oxide cathode materials (e.g., $Na_xTMO_2$). When mixed with aluminum diethylphosphinate and sintered, the material forms a surface layer of sodium aluminum phosphate ($Na_{(3-3x)}Al_xPO_4$), which exhibits high sodium-ion conductivity. This coating significantly enhances the electrochemical performance (e.g., rate capability) of the sodium-ion cathode.

EXAMPLE 1

Take 15 g of the high-nickel ternary cathode material described in Comparative Example 1 and 0.015 g of aluminum diethylphosphinate. Mix the materials uniformly using a high-speed mixer, and then sinter them under an oxygen atmosphere. The sintering procedure is as follows: sinter at 700° C. for 10 h with a heating rate of 2° C./min.

EXAMPLE 2

Take 15 g of the high-nickel ternary cathode material described in Comparative Example 1 and 0.030 g of aluminum diethylphosphinate. Mix the materials uniformly using a high-speed mixer, and then sinter them under an oxygen atmosphere. The sintering procedure is as follows: sinter at 700° C. for 10 h with a heating rate of 2° C./min.

EXAMPLE 3

Take 15 g of the high-nickel ternary cathode material described in Comparative Example 1 and 0.075 g of aluminum diethylphosphinate. Mix the materials uniformly using a high-speed mixer, and then sinter them under an oxygen atmosphere. The sintering procedure is as follows: sinter at 700° C. for 10 h with a heating rate of 2° C./min.

EXAMPLE 4

Take 15 g of the high-nickel ternary cathode material described in Comparative Example 2 and 0.015 g of aluminum diethylphosphinate. Mix the materials uniformly using a high-speed mixer, and then sinter them under an oxygen atmosphere. The sintering procedure is as follows: sinter at 700° C. for 10 h with a heating rate of 2° C./min.

EXAMPLE 5

Take 15 g of the high-nickel ternary cathode material described in Comparative Example 2 and 0.030 g of aluminum diethylphosphinate. Mix the materials uniformly using a high-speed mixer, and then sinter them under an oxygen atmosphere. The sintering procedure is as follows: sinter at 700° C. for 10 h with a heating rate of 2° C./min.

EXAMPLE 6

Take 15 g of the sodium-ion battery layered metal oxide cathode material described in Comparative Example 3 and 0.075 g of aluminum diethylphosphinate. Mix the materials uniformly using a high-speed mixer, and then sinter them under an air atmosphere. The sintering procedure is as follows: sinter at 700° C. for 10 h with a heating rate of 2° C./min.

COMPARATIVE EXAMPLE 1

Take the NCM811 precursor (with a particle size where 3 μm<D50<5 μm) and lithium hydroxide monohydrate, and mix them uniformly at a molar ratio of 1:1.05. Then, conduct sintering in an oxygen atmosphere. The sintering procedure is as follows: sinter at 400° C. for 4 h, then sinter at 800° C. for 12 h, with a heating rate of 2° C./min.

COMPARATIVE EXAMPLE 2

Take the NCM811 precursor (with a particle size where 9 μm<D50<12 μm) and lithium hydroxide monohydrate, and mix them uniformly at a molar ratio of 1:1.05. Then, conduct sintering in an oxygen atmosphere. The sintering procedure is as follows: sinter at 400° C. for 4 h, then sinter at 800° C. for 12 h, with a heating rate of 2° C./min.

COMPARATIVE EXAMPLE 3

Take the NFM111 precursor (where 9 μm<D50<12 μm) and sodium carbonate, and mix them uniformly at a molar ratio of 1:1.05. Then, perform sintering in an air atmosphere. The sintering procedure is as follows: sinter at 400° C. for 4 h and then at 900° C. for 12 h, with a heating rate of 2° C./min.

The cyclic performance testing of the samples is carried out. For the conventional testing, the voltage window is set at 2.75-4.3 V.

The sieved active material, conductive carbon black, and binder are dispersed in an NMP (N-methylpyrrolidone) solution at a mass ratio of 92:4:4. Followed by homogenization using a high-speed mixer. The resulting slurry was uniformly coated onto an aluminum current collector, dried, and roll-pressed. In an argon-filled glovebox, the coated foil was cut into circular cathodes and assembled into CR2035 coin-type half-cells with lithium metal anodes, using 1 M LiPF6 in ethylene carbonate/dimethyl carbonate (EC: DMC, 1:1 v/v) as the electrolyte and a polyethylene microporous membrane as the separator. Cycling tests were conducted on a LAND battery test system at a 1 C rate within a voltage window of 2.75-4.3 V. As for some of the samples, high-voltage cyclic performance testing is conducted, with the testing voltage window set at 2.75-4.5 V.

As shown in Table 1, the capacity retention rates after 80 cycles demonstrated significant improvement in the modified samples. The unmodified Comparative Examples 1 and 2 exhibited only 71.92% and 63.56% retention respectively, indicating substantial capacity fade during cycling. In contrast, Examples 1-5 incorporating aluminum diethylphosphinate modification showed superior performance with retention rates exceeding 85%, directly attributable to the protective coating layer formed by the aluminum diethylphosphinate-derived modification process and optimized thermal treatment. The capacity retention rate, defined as the ratio of discharge capacity at a given cycle to the initial capacity, serves as a critical indicator of electrochemical cycling stability, with higher values corresponding to enhanced long-term performance. This marked improvement in capacity retention confirms the effectiveness of the surface modification approach in stabilizing the cathode material structure during high-voltage operation.

TABLE 1

Capacity Retention Rates of Comparative Example 1, Comparative Example 2, and Examples 1-5 after 80 Cycles

| | The capacity retention rates (80 cycles)/% |
|---|---|
| Comparative Example 1 | 71.92 |
| Example 1 | 88.85 |
| Example 2 | 84.77 |
| Example 3 | 88.66 |
| Comparative Example 1 | 63.56 |
| Example 4 | 83.84 |
| Example 5 | 79.02 |

Figure 2:
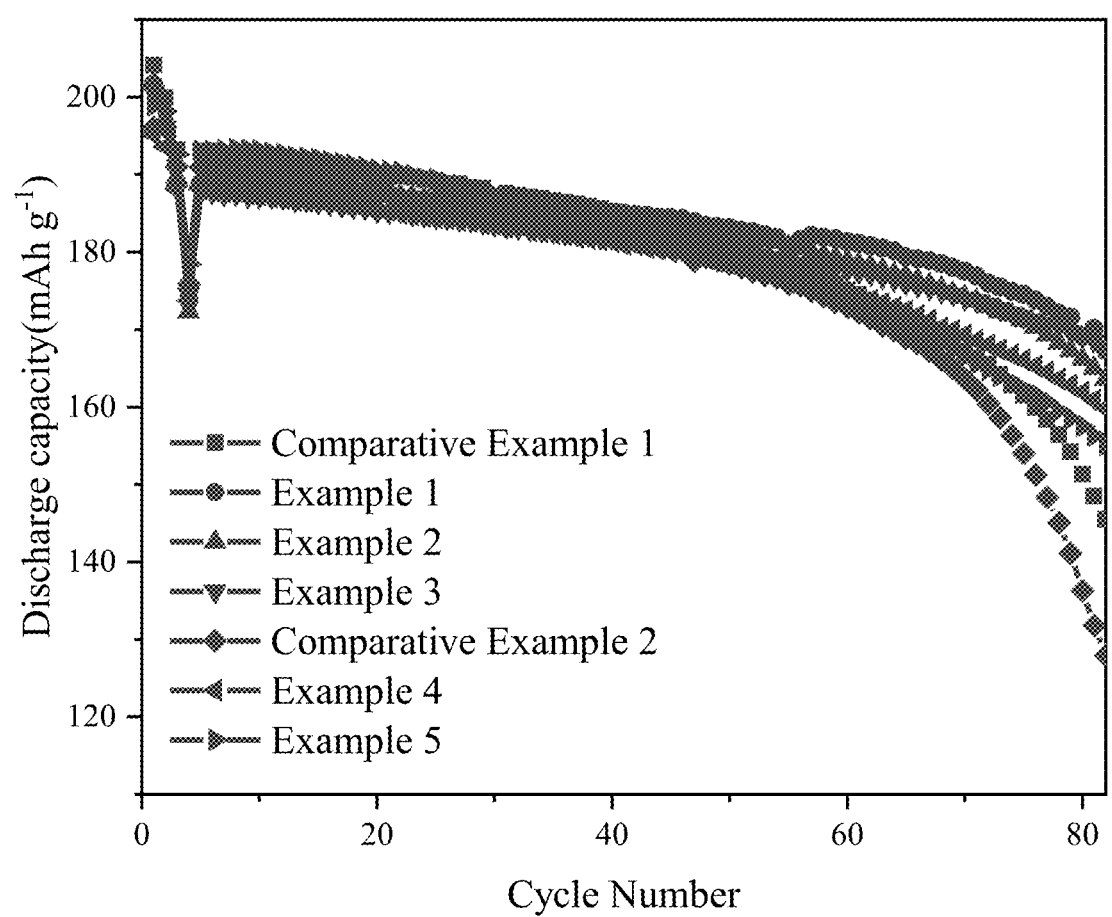
FIG. 2 is a cycling performance plot comparing Comparative Examples 1-2 and Examples 1-5 at a 1C rate within a voltage range of 2.75 V to 4.3 V.

FIG. 2 presents the cycling performance comparison of Comparative Examples 1-2 and Examples 1-5. In the later cycling stages, Examples 1-5 demonstrate significantly higher capacity than Comparative Examples 1-2, confirming the superior cycling performance of the modified high-nickel ternary cathode materials. To further investigate the electrochemical properties, charge-discharge curves of Comparative Example 1 and Examples 1-3 were analyzed.

Figure 3:
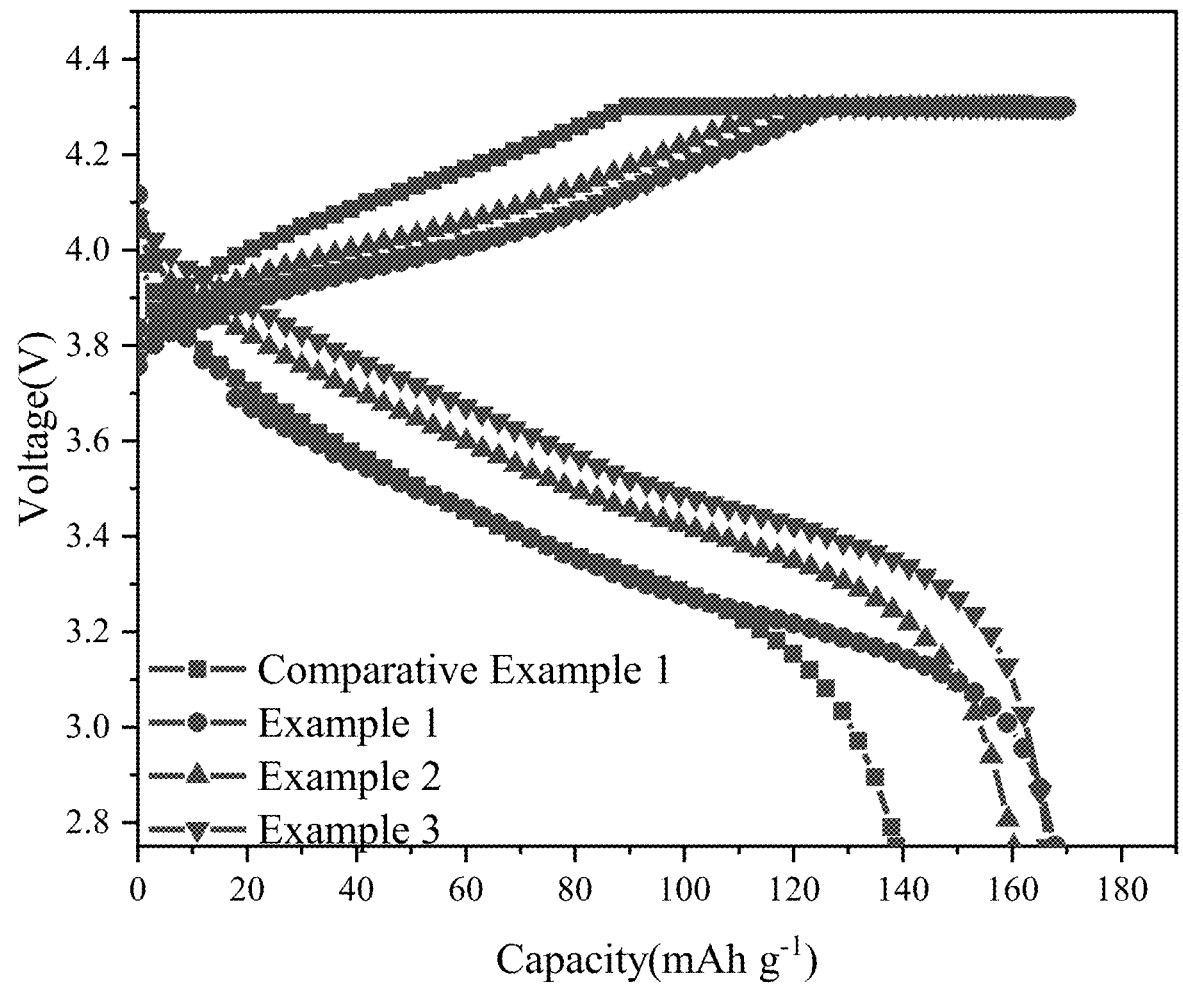
FIG. 3 shows charge-discharge curves of Comparative Example 1 and Examples 1-3 after 80 cycles.

As shown in FIG. 3, the charge-discharge curves of Examples 1-3 exhibit markedly better performance than Comparative Example 1. After 80 cycles, Examples 1-3 show significantly less impedance increase compared to the unmodified sample. This improvement primarily results from the protective coating layer formed by the thermal treatment of aluminum diethylphosphinate, which effectively suppresses side reactions between the cathode material and electrolyte, thereby delaying structural degradation during cycling. Notably, Examples 2 and 3 maintain higher discharge plateau voltages after 80 cycles at 4.3 V. To further verify the high voltage resistance characteristics of the modified material, cyclic performance tests were conducted with a window voltage of 2.75-4.5 V.

Figure 4:
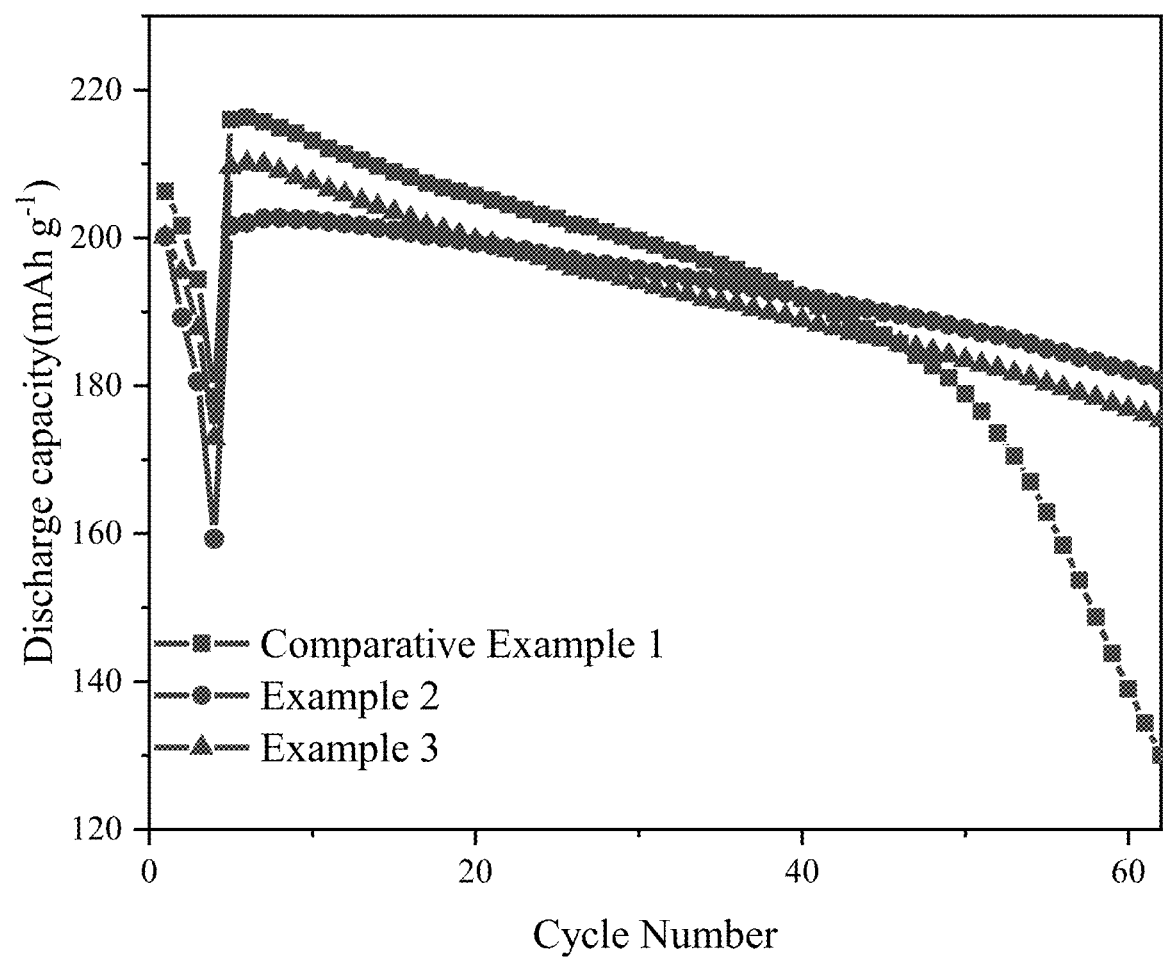
FIG. 4 depicts the cycling performance of Comparative Example 1, Example 2, and Example 3 at a 1C rate within an extended voltage range of 2.75 V to 4.5 V.

FIG. 4 compares the cycling performance at 2.75-4.5 V operating voltage for Comparative Example 1 and Examples 2-3. After 60 cycles at 1C rate, the specific capacities measure 122.5, 178.1, and 173.9 mAh g$^{-1}$ respectively, corresponding to capacity retention rates of 56.71%, 84.49%, and 82.97%. The substantial performance improvement confirms that aluminum diethylphosphinate modification effectively enhances the high-voltage cycling performance of high-nickel ternary cathode materials.

Compared to conventional technologies, the stable interfacial coating layer composed of aluminum phosphate and lithium phosphate provides dual benefits: (1) The strong covalent P—O bonds ensure structural stability; (2) The reactive phosphate compounds interact with residual lithium to form lithium-ion conductive phases. This composite coating effectively isolates electrode-electrolyte contact, suppresses interfacial side reactions, and reduces the impedance generated by substances such as alkyl lithium formed by the decomposition of the electrolyte on the electrode surface, thereby effectively improves the cycling performance.

Table 2 shows the gram capacities and first charge-discharge efficiencies of the samples of Comparative Example 3 and Example 6 at different rates under a working voltage of 2.0-4.0 V. The first charge-discharge efficiency of Comparative Example 3 is 92.2%, and the discharge capacities at rates of 0.2 C, 0.5 C, 1.0 C, and 3 C are 132.8, 131.1, 127.6, and 117.5 mAh g$^{-1}$ respectively. The first charge-discharge efficiency of Example 6 is 94.1%, which is significantly higher than that of Comparative Example 3. The discharge capacities at rates of 0.2 C, 0.5 C, and 1.0 C are close to those of Comparative Example 3, but the discharge capacity at a rate of 3.0 C is 121.7 mAh g$^{-1}$, which is significantly higher than that of Comparative Example 3. This indicates that the layered metal oxide cathode material for sodium-ion batteries modified by aluminum diethylphosphinate can significantly improve its rate performance.

TABLE 2

The rate capability comparison between Comparative Example 3 and Example 6 at 2.0-4.0 V operating voltage

| | The first-cycle efficiency/% | 0.2 C/ mAh g$^{-1}$ | 0.5 C/ mAh g$^{-1}$ | 1 C/ mAh g$^{-1}$ | 3 C/ mAh g$^{-1}$ |
|---|---|---|---|---|---|
| Comparative Example 3 | 92.2 | 132.8 | 131.1 | 127.6 | 117.5 |
| Example 6 | 94.1 | 132.8 | 131.0 | 128.7 | 121.7 |

In contrast to the prior art, the present invention constructs an interfacial layer with high ionic conductivity on the surface of the layered metal oxide cathode material for sodium-ion batteries. This interfacial layer, referred to as the modified layer, is composed of the sodium aluminum phosphate compound Na$_{(3-3x)}$Al$_x$PO$_4$. By this construction, the diffusion rate of sodium ions on the surface of the cathode material is enhanced. As a result, the modified cathode material demonstrates outstanding electrochemical performance.

The above descriptions merely represent the preferred embodiments of the present invention and are not intended to delimit the scope of protection of the present invention. Any modifications, equivalent substitutions, improvements, or the like made under the spirit of the present invention shall fall within the scope defined by the claims of the present invention.

What is claimed is:

1. A method for preparing a modified high-nickel ternary cathode material, comprising:

step 1: providing a high-nickel ternary cathode material and aluminum diethylphosphinate, wherein a mass ratio of the high-nickel ternary cathode material to the aluminum diethylphosphinate is 100: (0.01-5), and the high-nickel ternary cathode material has a surface containing a residual alkaline lithium carbonate (Li$_2$CO$_3$);

step 2: providing a sintering device filled with a controlled sintering atmosphere;

step 3: mixing the high-nickel ternary cathode material with the aluminum diethylphosphinate to obtain a mixture;

step 4: sintering the mixture in the sintering device at a sintering temperature ranging from 500° C. to 800° C. for a sintering duration of 2 to 20 h with a heating rate of 0.5° C./min to 5° C./min, thereby forming the modified high-nickel ternary cathode material comprising a coating layer of aluminum phosphate (AlPO$_4$) and lithium phosphate (Li$_3$PO$_4$).

2. The method according to claim 1, wherein the high-nickel ternary cathode material is LiNi$_{0.8}$Co$_{0.1}$Mn$_{0.1}$O$_2$ (NCM811), and the NCM811 has a median particle size (D50) in a range of 2 μm to 16 μm.

3. The method according to claim 1, wherein the controlled sintering atmosphere is selected from the group consisting of oxygen, air, nitrogen, argon, hydrogen, and a hydrogen-argon mixture.

4. The method according to claim 1, wherein the method for mixing the high-nickel ternary cathode material with the aluminum diethylphosphinate is selected from mechanical mixing or ball milling.

5. The method according to claim 1, wherein the sintering temperature in the step 4 is 600° C. to 700° C.

6. The method according to claim 1, wherein the sintering duration in the step 4 is 10 h.

7. The method according to claim 1, wherein the heating rate in the step 4 is 2° C./min.

* * * * *